Jan. 1, 1924. 1,479,748
M. L. SHAW ET AL
GLASS CUTTING FRAME
Filed Feb. 28, 1923 2 Sheets-Sheet 1
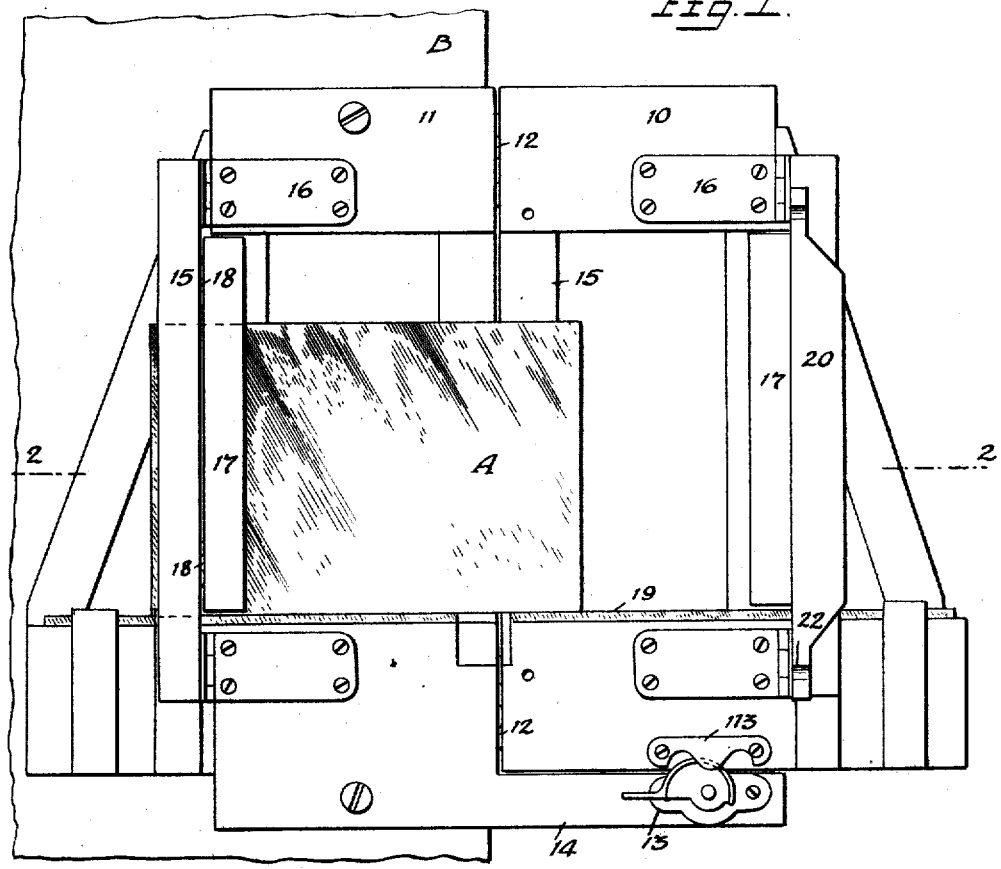
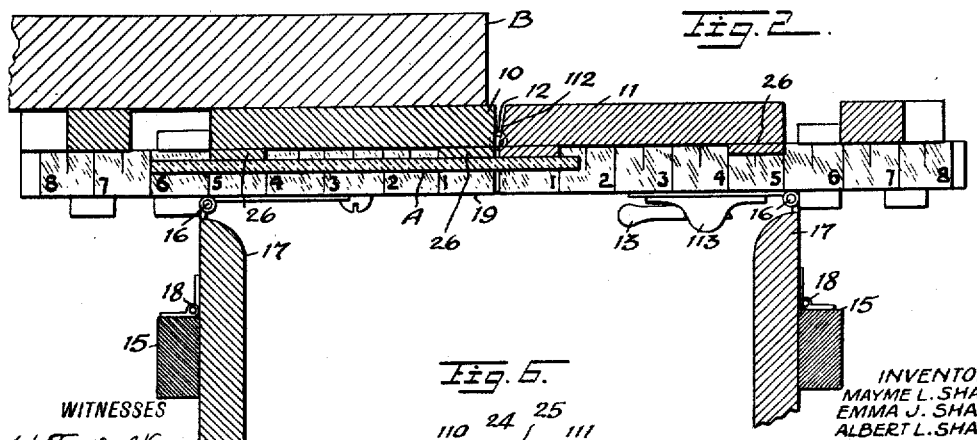
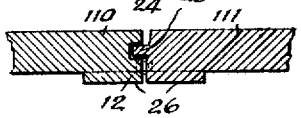
WITNESSES
INVENTOR
MAYME L. SHAW
EMMA J. SHAW
ALBERT L. SHAW
BY
ATTORNEYS

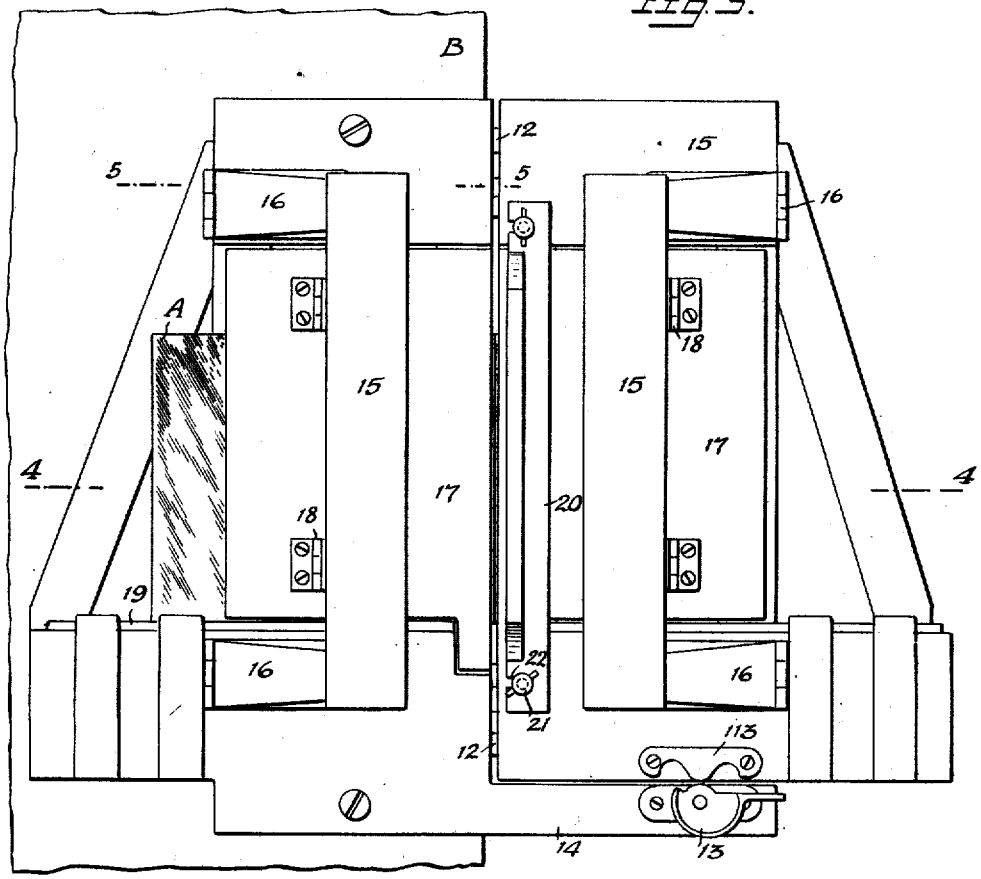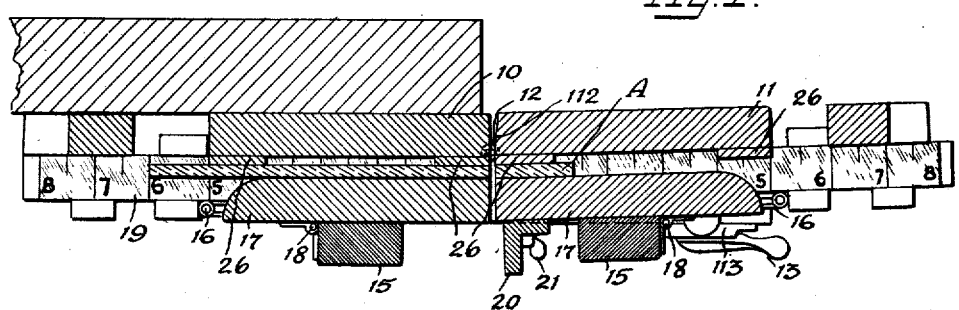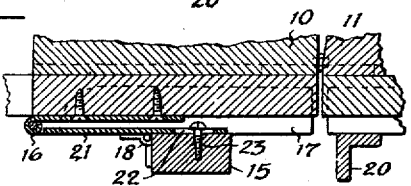

Patented Jan. 1, 1924.

1,479,748

UNITED STATES PATENT OFFICE.

MAYME L. SHAW, EMMA J. SHAW, AND ALBERT L. SHAW, OF CORINNE, UTAH.

GLASS-CUTTING FRAME.

Application filed February 28, 1923. Serial No. 621,938.

*To all whom it may concern:*

Be it known that we, MAYME L. SHAW, EMMA J. SHAW, and ALBERT L. SHAW, citizens of the United States of America, and residents of Corinne, in the county of Boxelder and State of Utah, have invented a new and Improved Glass-Cutting Frame, of which the following is a description.

Our invention relates to a glass cutting frame which may and preferably is used in a vertical position to prevent particles of glass from falling upon a table or like support although it is to be understood that the frame may be used on a table if desired.

The general object is to provide a glass cutting frame into which the glass may be placed and adjusted with facility for the accurate cutting of the glass as well as to provide frame sections adapted jointly to receive the glass or other material to be cut and having a hinge connection to swing one at a slight angle relatively to the other for accurately breaking off the cut portion of the glass.

A more specific object of the invention is to provide for the secure clamping of the glass and the cutting of the same with facility and otherwise to provide for the convenient use of the frame for its purpose.

Reference is to be had to the accompanying drawings forming a part of this specification, it being understood that the drawings are merely illustrative of two examples of the invention.

Figure 1 is a front elevation of a glass cutting frame embodying our invention, the clamps being shown swung to the open position;

Figure 2 is a horizontal section on the line 2—2, Figure 1;

Figure 3 is a view similar to Figure 1 but with the clamp means closed upon the glass to firmly hold the same;

Figure 4 is a horizontal section on the line 4—4, Figure 3;

Figure 5 is a section in a plane parallel with Figure 4 and transecting the adjusting hinge to be hereinafter referred to;

Figure 6 is a detail in vertical section through the frame members at the hinge sides, the view illustrating a modification of the adjacent edges of said frame members.

In carrying out our invention in accordance with the illustrated example frame sections 10 and 11 are provided, hingedly connected at 12 to have a slight movement relatively to one another, one of the hinged edges, 112, being slightly bevelled to permit the desired limited swinging movement. The swinging of the one section relatively to the other is for the purpose of breaking off the cut glass after cutting or scoring the same as will appear.

A suitable fastening means may be provided to hold the sections 10 and 11 from movement on the hinges 12, there being shown for the purpose a known form of fastener comprising a turnable element 13 on an L-arm 14 of the one frame section 10 and a coacting fastener element 113 on the other frame section 11.

We provide clamp means to hold the glass A firmly on the frame sections 10, 11. Advantageously, the clamp means consists of a bar 15 secured by strap hinges 16 to the respective sections 10, 11 so that the bar 15 swings in an arc with the axes of the hinges 16 as centers. Each bar 15 carries a flat clamp element 17 secured by hinges 18 to said bar 15. Thus, the two hinge centers provided by the hinges 16, 18 enable the clamp element 17 to be brought parallel with and flat against the glass A. The glass A is laid on the sections 10, 11 across the joint thereof by being passed under one of the clamp elements 17 when the latter is swung to the open position as in Figure 1. When the frame is employed in vertical position as against a window frame indicated conventionally in part at B or other vertical sustaining structure, the glass rests at its lower edge upon a ledge 19 having a suitable scale for positioning the glass for the accurate cutting off of a desired portion of the glass.

A gage angle bar 20 is provided at one of the frame sections as 11 adjacent to the free edge thereof so as to lie when said section is closed upon the glass adjacent to the line of the hinge joint between the frame sections 11, 12. Said gage bar 20 serves for guiding the glass cutter (not shown) along the glass A in line with the joint between the frame sections 10, 11. After the glass has been cut or scored in the usual manner by the glass cutter, the fastening elements 13 and 113 are disengaged if they have been engaged with one another and the frame section 11 is swung by a quick movement about the axis of the hinges 12 thereby breaking off the glass at the joint between the sections 10, 11.

For the purpose of adjusting the relation between the frame members 10, 11 and the clamps including the members 15, 17, one leaf 21 of each hinge 16 is adjustably connected with the clamp member 15 through the medium of a slot and pin connection, there being a slot 22 in said hinge leaf and a screw 23 passing through said slot and into a member 15.

In Figure 6 the frame members 110, 111 are shown with the described hinge 12. In said modification the edge of one frame member 110 has a groove 24 and the edge of the opposite member 111 has a tongue 25 accommodated in said groove the tongue and groove connection permitting the described slight movement of the members 110, 111 for breaking the glass. The numeral 26 indicates members applied to the frame members 10, 110, 11 and 111 to present the bearing surface for the glass.

We would state in conclusion that while the illustrated examples constitute practical embodiments of our invention, we do not limit ourselves strictly to the exact details herein illustrated, since, manifestly, the same can be considerably varied without departure from the spirit of the invention as defined in the appended claims.

Having thus described our invention, we claim:

1. A glass cutting frame including separate sections jointly presenting a surface against which the glass to be cut may be placed for cutting, one of said sections movable relatively to the other to break off the cut glass.

2. A glass cutting frame including separate sections jointly presenting a surface against which the glass to be cut may be placed for cutting, said sections having a hinge connection permitting a swinging of one section relatively to the other for the breaking off of the cut glass.

3. A glass cutting frame including separate sections jointly presenting a surface against which the glass to be cut may be placed for cutting, said sections having a hinge connection permitting a swinging of one section relatively to the other for the breaking off of the cut glass; the edge of one section at the hinge being bevelled for determining the limited swinging movement of the section.

4. A glass cutting frame including separate sections jointly presenting a surface against which the glass to be cut may be placed for cutting, one of said sections movable relatively to the other to break off the cut glass; together with clamp means on the frame to firmly hold the glass on said sections.

5. A glass cutting frame including separate sections jointly presenting a surface against which the glass to be cut may be placed for cutting, one of said sections movable relatively to the other to break off the cut glass; together with separate clamp means on each section to jointly hold the glass firmly on the sections.

6. A glass cutting frame comprising separate sections hingedly connected and having a limited swinging movement on the hinge connection, said sections jointly adapted to receive the glass to be cut, and separate clamps on each section, each clamp comprising a bar hinged to the section and a clamp element hinged to said bar.

7. A glass cutting frame including separate sections jointly presenting a surface against which the glass to be cut may be placed for cutting, said sections having a hinge connection permitting a swinging of one section relatively to the other for the breaking off of the cut glass, said sections furthermore having respectively a tongue and groove at the joint between the sections.

8. A glass cutting frame including separate sections jointly presenting a surface against which glass to be cut may be placed for cutting, clamp means on the frame to firmly hold the glass on said sections, and an adjustable hinge connection between said clamp means and one of said frame sections.

MAYME L. SHAW.
EMMA J. SHAW.
ALBERT L. SHAW.